(12) United States Patent
Nagasawa et al.

(10) Patent No.: US 8,594,044 B2
(45) Date of Patent: Nov. 26, 2013

(54) WIRELESS COMMUNICATION APPARATUS

(75) Inventors: Chizuko Nagasawa, Yokohama (JP); Kugo Morita, Yokohama (JP)

(73) Assignee: Kyocera Corporation, Kyoto (JP)

( * ) Notice: Subject to any disclaimer, the term of this patent is extended or adjusted under 35 U.S.C. 154(b) by 372 days.

(21) Appl. No.: 12/919,439

(22) PCT Filed: Feb. 23, 2009

(86) PCT No.: PCT/JP2009/053223
§ 371 (c)(1),
(2), (4) Date: Aug. 25, 2010

(87) PCT Pub. No.: WO2009/107587
PCT Pub. Date: Sep. 3, 2009

(65) Prior Publication Data
US 2011/0044288 A1    Feb. 24, 2011

(30) Foreign Application Priority Data

Feb. 27, 2008    (JP) .................................. 2008-045833

(51) Int. Cl.
*H04W 4/00* (2009.01)

(52) U.S. Cl.
USPC .......................................................... 370/331

(58) Field of Classification Search
USPC .......................................................... 370/331
See application file for complete search history.

(56) References Cited

U.S. PATENT DOCUMENTS

| | | | |
|---|---|---|---|
| 7,440,430 B1 * | 10/2008 | Jagadeesan et al. | 370/331 |
| 7,590,064 B1 * | 9/2009 | Zhang et al. | 370/235 |
| 8,085,678 B2 | 12/2011 | Spindola et al. | |
| 2006/0077994 A1 * | 4/2006 | Spindola et al. | 370/412 |
| 2011/0222423 A1 | 9/2011 | Spindola et al. | |

FOREIGN PATENT DOCUMENTS

| | | |
|---|---|---|
| JP | 2006-050488 A | 2/2006 |
| JP | 2006-238445 A | 9/2006 |
| JP | 2007-214985 | 8/2007 |
| KR | 20060128103 | 12/2006 |
| KR | 20070064673 | 6/2007 |
| WO | 2006/044696 A1 | 4/2006 |

OTHER PUBLICATIONS 10-2010-7018996, Dec. 23, 2012, Korean Office Action and English Translation.
JP 2010-500679, Apr. 10, 2012, Notification of Reason for Refusal.

* cited by examiner

*Primary Examiner* — Mark Rinehart
*Assistant Examiner* — Maharishi Khirodhar
(74) *Attorney, Agent, or Firm* — Workman Nydegger

(57) ABSTRACT

In order to perform handover from a first wireless communication network to a second wireless communication network, a handover control unit obtains a handover preparation time to handover, and by receiving data via the first wireless communication network and the second wireless communication network separately obtains a delay time difference between the networks based on reception times of the same data. Based on such information obtained and an amount of the data in a jitter buffer at a point to determine to start handover preparation, the handover control unit controls a reproduction speed of an application being executed. Thereby, it is possible to perform handover to a different wireless communication network without deteriorating reproduction quality and real-time property and causing packet loss.

14 Claims, 13 Drawing Sheets

FIG. 4
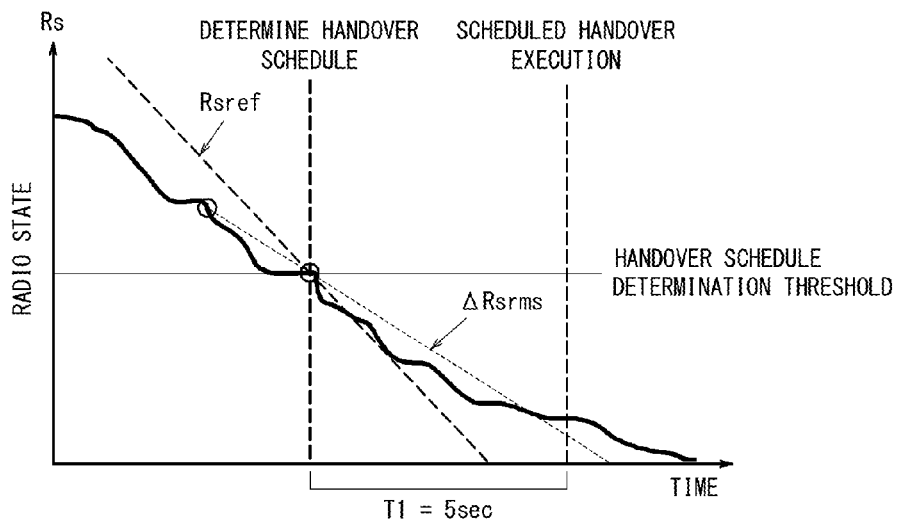
(a)
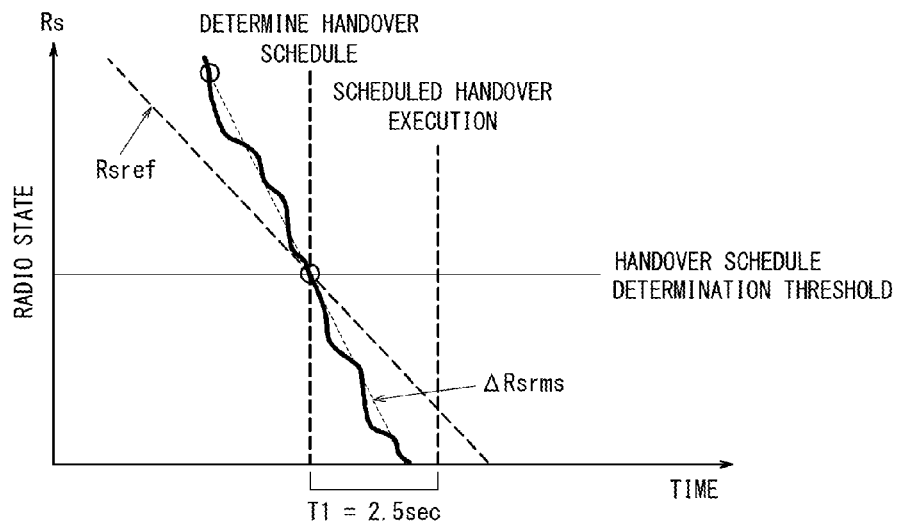
(b)

US 8,594,044 B2

WIRELESS COMMUNICATION APPARATUS

CROSS REFERENCE TO RELATED APPLICATION

This application claims priority to and the benefit of Japanese Patent Application No. 2008-45833 filed on Feb. 27, 2008, the entire contents of which are incorporated herein by reference.

TECHNICAL FIELD

The present invention relates to wireless communication apparatuses capable of performing handover between different wireless communication networks.

BACKGROUND ART

In recent years, IETF (Internet Engineering Task Force) has been considering an IP mobility scheme for seamless movement and capable of performing handover between a plurality of different wireless communication networks, such as a cellular phone network, a wireless LAN and the likes, in order to achieve ubiquitous environment. As a specific protocol of the IP mobility scheme, there are Mobile IPv4 and Mobile IPv6 (which are abbreviated as Mobile IP, hereinafter) for supporting movement of individual communication terminal, and NEMO (Network Mobility) for supporting mobility of a network as a unit.

Incidentally, when an application (hereinafter, abbreviated as APP arbitrarily) such as VoIP having a real-time property is executed via the wireless communication network, an allowable bandwidth of a wireless communication path changes depending on a propagation environment such as fading, and arrival intervals of packets received by the communication terminal are changed in accordance with a change of the allowable bandwidth.

For this reason, it is generally performed to provide the communication terminal with a jitter buffer so as to first store received packets in the jitter buffer and then read out the packets from the jitter buffer and reproduce the packets at intervals based on the application. Thereby, it absorbs deviation in the packets, that is, displacement of reproduction intervals of packets caused by displacement (jitter) of the arrival intervals of the packets, so as to prevent deterioration of reproduction quality such as reproduced sound quality and the likes. Moreover, when there is no packet in the jitter buffer since the jitter is large, and therefore silence occurs, or when too many packets are received in a short period to be stored in the jitter buffer, the communication terminal changes a reproduction speed, discards received packets, or changes a size of the jitter buffer.

On the other hand, a downlink absolute delay time of a packet received by the communication terminal, that is, a time (delay time) required for a packet transmitted from a counterpart communication terminal to be received via the wireless communication network varies depending on wireless communication networks. Thus, if the communication terminal is a wireless communication apparatus which is moving and performs handover to a different wireless communication network, and when the downlink absolute delay time of a handover destination is longer than that of a handover source, for example, it causes a blank period not receiving a packet according to the difference between the downlink absolute delay times.

In such a case, if the blank period not receiving the packet is longer than a time required to read out a last packet (that is, a jitter buffer standard delay time), received from the wireless communication network of the handover source, from the jitter buffer when packets are read out from the jitter buffer at certain intervals based on an APP and reproduced at a certain reproduction speed, for example, there is no packet in the jitter buffer for a period of such exceeding time. As a result, since reproduction of packets is not performed at least during this period, it causes silence and deteriorates reproduction quality.

FIG. 10 shows diagrams for explaining a control method of the jitter buffer in the above case. FIG. 10(a) shows the number of packets received by the jitter buffer for a unit period, FIG. 10(b) shows the reproduction speed (read-out intervals) of packets from the jitter buffer, and FIG. 10(c) shows the number of packets in the jitter buffer. FIG. 11 shows flows of the packets in that case. In FIG. 11, "Transmission", "Reception" and "Reproduction" indicate a transmission timing of a packet by the counterpart communication terminal, a reception timing of the packet received by the jitter buffer of the wireless communication apparatus, and a reproduction timing of the packet (timing to read out the packet from the jitter buffer) by the wireless communication apparatus, respectively. Here, it is assumed that there is no deviation in received packets (displacement of arrival intervals) either at a wireless communication network A of the handover source and a wireless communication network B of the handover destination.

As obvious from FIG. 10 and FIG. 11, no packet is reproduced for a time Tn={(TddnB−TddnA)−Ta}, if a downlink absolute delay time TddnB of the wireless communication network B of the handover destination is longer than a downlink absolute delay time TddnA of the wireless communication network A of the handover source and the difference (TddnB−TddnA) is longer than a jitter buffer standard delay time Ta, which is applied to received packets when there is a standard number of packets in the jitter buffer. In such a case, moreover, since packets are reproduced immediately after being received from the wireless communication network B of the handover destination, it is not possible to absorb jitter.

In order to improve such a defect at handover, it is considered, for example, to set the absolute delay time of each wireless communication network which allows the wireless communication apparatus to perform handover, in advance, into the wireless communication apparatus, a Home Agent or the like; to obtain the absolute delay times set for the handover source and the handover destination; and to control the reproduction speed based on such a delay time difference not to occur a period of silence.

Alternatively, it is considered to employ, for example, a jitter buffer control method (Patent Document 1, for example) which monitors a reception condition of packets and, if packets are not received at normal reception intervals, controls reading out of the packets from the jitter buffer, that is, the reproduction speed of the packets.

FIG. 12 shows diagrams illustrating a control method of the reproduction speed when employing the jitter buffer control method disclosed in Patent Document 1. FIG. 12(a) to (c), in the same manner as FIG. 10(a) to (c), show the number of packets received by the jitter buffer in a unit time, the reproduction speed, and the number of packets in the jitter buffer, respectively. FIG. 13 shows flows of the packets in such a case.

As shown in FIG. 12 and FIG. 13, if packets cannot be received at previous reception intervals such as when handover is performed from the wireless communication network A with the downlink absolute delay time TddnA to the wireless communication network B with the downlink absolute delay time TddnB longer than TddnA, the reproduction speed of packets in the jitter buffer is gradually reduced in accordance with increase in the reception intervals. When the reception intervals return to normal intervals thereafter, the reproduction speed is controlled to gradually increase to the normal reproduction speed in accordance with the number of packets in the jitter buffer.

Patent Document 1: Japanese Patent Laid-Open No. 2006-238445

SUMMARY OF INVENTION

Technical Problem

However, the former reproduction speed control method which uses the absolute delay time previously set for each wireless communication system may cause, at handover, a significant difference between an actual absolute delay time of the wireless communication systems of the handover source and the handover destination and the set absolute delay time, if the absolute delay time of each wireless communication system changes dramatically depending on a radio state and the likes.

Accordingly, if the delay time difference calculated is longer than the actual delay time difference, it results in reduction of the reproduction speed more than required. As a result, for VoIP, since the reproduction speed changes dramatically from an original speed of voice, quality of reproduced voice is significantly deteriorated leading deterioration of reproduction quality, which makes hard for a user to hear. In contrast, if the calculated delay time difference is shorter than the actual delay time difference, silence is generated because of running out of the packets accumulated in the jitter buffer, which prevents achievement of an initial object.

In addition, the jitter buffer control method disclosed in Patent Document 1, controls only the reproduction speed of packets currently stored in the jitter buffer to be gradually reduced when the packets cannot be received at previous reception intervals. Therefore, it is concerned that, when the downlink absolute delay time TddnB of the handover destination is relatively long, the reproduction speed is slowed down too much, which leads to deterioration of the reproduction quality.

Although FIG. 12 and FIG. 13 show an exemplary control method when silence and the like caused by no packet in the jitter buffer does not occur, it is practically unknown how long the reception intervals of the packets will be. It is thus concerned that, depending on the jitter buffer standard delay time Ta or the downlink absolute delay time TddnB of the handover destination, the jitter buffer may become empty causing silence and the likes. Although the jitter buffer standard delay time Ta may be set longer so as to prevent silence, this causes delay in reproduction of packets from the counterpart terminal in VoIP, for example, which loses the real-time property.

In consideration of such problems, it is an object of the present invention to provide wireless communication apparatuses capable of performing handover to a different wireless communication network without deteriorating the reproduction quality and the real-time property.

Solution to Problem

In order to achieve the above object, a wireless communication apparatus according to a first aspect of the present invention includes:

a wireless communication unit for performing wireless communication by connecting to a first wireless communication network and a second wireless communication network different from the first wireless communication network;

an execution unit for executing an application for real-time communication via the wireless communication unit;

a communication quality obtaining unit for obtaining communication quality of a wireless link of the first wireless communication network during execution of the application by connecting to the first wireless communication network;

a determination unit for determining whether to start preparing handover from the first wireless communication network to the second wireless communication network based on the communication quality obtained by the communication quality obtaining unit;

an estimation unit, when the determination unit determines to start handover preparation during execution of the application, for estimating a handover preparation time to start handover based on the communication quality obtained by the communication quality obtaining unit;

a measuring unit, when the determination unit determines to start handover preparation, for receiving data via the first wireless communication network and the second wireless communication network separately and measuring a delay time difference between the first wireless communication network and the second wireless communication network based on reception times of the same data received; and a control unit for controlling a reproduction speed of the application by the execution unit based on the handover preparation time estimated by the estimation unit, the delay time difference measured by the measuring unit, and an amount of data in a jitter buffer monitored by a jitter buffer monitoring unit at a time when the determination unit determines to start handover preparation.

A second aspect of the present invention is that, in the wireless communication apparatus according to the first aspect, the control unit, if the reception time by the second wireless communication network is later than the reception time by the first wireless communication network by a predetermined time or longer, slows down the reproduction speed of the application by the execution unit.

A third aspect of the present invention is that, in the wireless communication apparatus according to the second aspect, the control unit slows down the reproduction speed of the application by the execution unit after starting handover preparation.

A fourth aspect of the present invention is that, in the wireless communication apparatus according to the third aspect, the control unit slows down the reproduction speed of the application by the execution unit such that the amount of data in the jitter buffer becomes zero at a time to start receiving data from the second wireless communication network.

A fifth aspect of the present invention is that, in the wireless communication apparatus according to the second aspect, the execution unit includes a jitter buffer for absorbing jitter of data received and a jitter buffer monitoring unit for monitoring an amount of data in the jitter buffer, and the control unit returns the reproduction speed of the application to a normal speed, if the amount of data in the jitter buffer monitored by the jitter buffer monitoring unit exceeds a predetermined amount after completion of handover to the second wireless communication network.

Advantageous Effects on Invention

In order to perform handover from the first wireless communication network to the second wireless communication network, the wireless communication apparatus according to the present invention preliminarily receives data via the first wireless communication network and the second wireless communication network separately, and obtains the handover preparation time and the delay time difference between the first wireless communication network and the second wireless communication network based on the reception times of the same data. Then, the reproduction speed of the application is controlled based on such information obtained and an amount of data in the jitter buffer at a time when it is determined to start handover preparation. Thereby, the reproduction speed of the application is optimally controlled based on the actual radio state at handover, which enables handover from the first wireless communication network to the second wireless communication network without deteriorating reproduction quality and real-time property.

BRIEF DESCRIPTION OF DRAWINGS

FIG. 4 is diagrams illustrating a calculation method of a handover preparation time by a handover control unit shown in FIG. 2;

| REFERENCE SIGNS LIST | |
|---|---|
| 11 | wireless communication apparatus (MN) |
| 12 | counterpart communication terminal |
| 12a | handset |
| 15 | first wireless communication network |
| 15a | access point |
| 16 | second wireless communication network |
| 16a | base station |
| 17 | packet network |
| 18 | internet |
| 21, 22 | SIP server |

| REFERENCE SIGNS LIST | |
|---|---|
| 23 | Home Agent (HA) |
| 31 | first wireless I/F |
| 32 | second wireless I/F |
| 33 | telephone function unit |
| 34 | communication processing unit |
| 35 | radio information obtaining unit |
| 36 | handover control unit |
| 47 | jitter buffer |
| 50 | jitter buffer monitoring unit |
| 51 | jitter buffer control unit |
| 55 | handover information obtaining unit |
| 56 | reproduction speed calculation unit |

DESCRIPTION OF EMBODIMENT

Embodiments of the present invention will be described with reference to the accompanying drawings.

Figure 1:
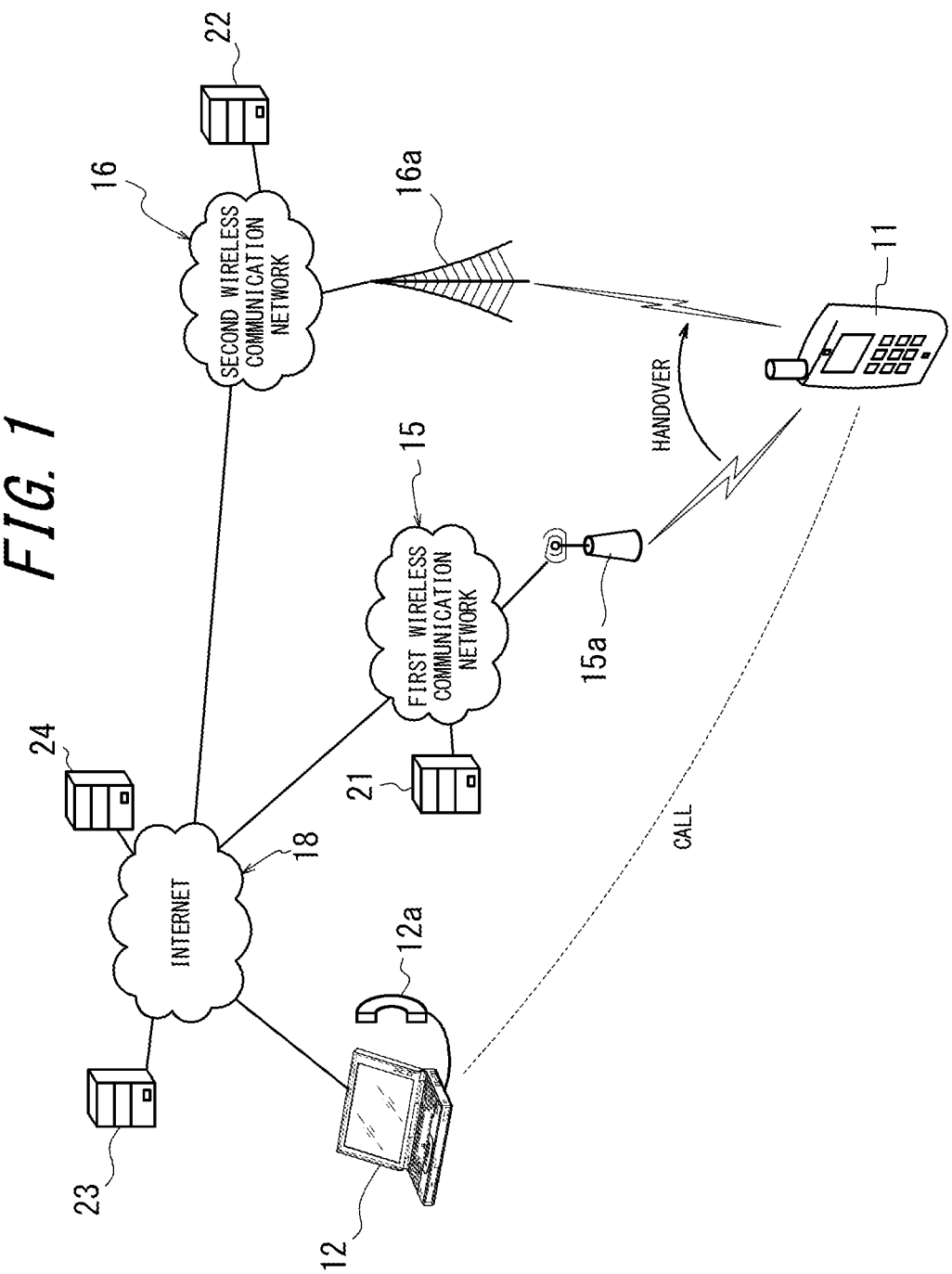
FIG. 1 is a diagram illustrating a schematic constitution of a communication network which a wireless communication apparatus according to an embodiment of the present invention can use.

FIG. 1 is a diagram illustrating a schematic constitution of an example of a communication network which a wireless communication apparatus according to an embodiment of the present invention can use. FIG. 1 shows a case where a wireless communication apparatus 11, which is a mobile node, calls a counterpart communication terminal 12, which is a correspondent node, by use of VoIP, an application for a real-time communication. The wireless communication apparatus 11 can perform handover between a first wireless communication network 15 and a second wireless communication network 16. The first wireless communication network 15 and the second wireless communication network 16 are connected to the internet 18.

Here, it is assumed that the first wireless communication network 15 is a wireless LAN (Local Area Network), for example, and the second wireless communication network 16 is a mobile phone network of cdma2000 1xEV-DO (Code Division Multiple Access 2000 1x Evolution Data Only), for example. It is also assumed that a delay time (downlink absolute delay time) of the first wireless communication network 15 is shorter than a delay time (downlink absolute delay time) of the second wireless communication network 16. In FIG. 1, a reference sign 15a indicates an access point of the first wireless communication network 15, whereas a reference sign 16a indicates a base station of the second wireless communication network 16.

The counterpart communication terminal 12 may be a personal computer, for example, having a handset 12a connected thereto and a softphone installed therein, and is connected to the internet 18 via an internet service provider (not shown).

The first wireless communication network 15 and the second wireless communication network 16 are connected to SIP (Session Initiation Protocol) servers 21 and 22 for controlling communication, respectively. In addition, a Home Agent (HA) 23 for transferring received packets addressed to the wireless communication apparatus 11 to a wireless communication network to which the wireless communication apparatus 11 is connected and a SIP server 24 for controlling communication are connected to the internet 18.

In the communication network shown in FIG. 1, a home address used in the wireless communication network to which the wireless communication apparatus 11 originally belongs is registered to the HA 23, and a care-of address of the wireless communication network 16 of a handover destination is also registered to the HA 23 at a time of handover. Thereby, the wireless communication apparatus 11 can perform handover between different wireless communication networks. Since such IP mobility techniques are known in the above Mobile IP and NEMO, detailed description thereof is omitted here.

In the present embodiment, it is assumed that the wireless communication network to which the wireless communication apparatus 11 originally belongs is the first wireless communication network 15, and handover is performed from the first wireless communication network 15 to the second wireless communication network 16.

Figure 2:
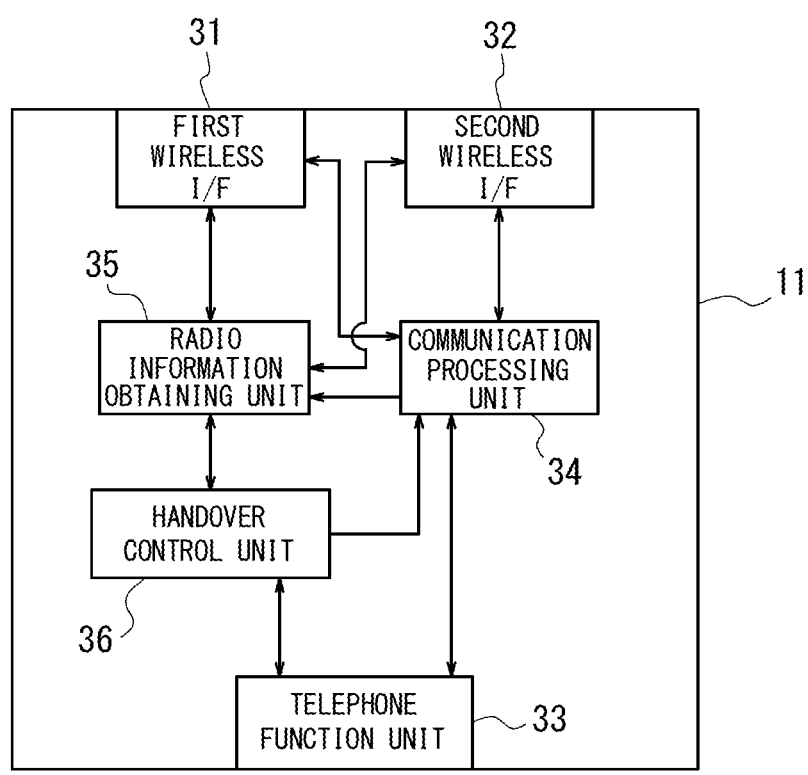
FIG. 2 is a block diagram illustrating a schematic constitution of the wireless communication apparatus shown in FIG. 1.

FIG. 2 is a functional block diagram illustrating a schematic constitution of the wireless communication apparatus according to the present embodiment shown in FIG. 1. The wireless communication apparatus 11 includes a first wireless I/F (interface) 31 corresponding to the first wireless communication network 15, a second wireless I/F 32 corresponding to the second wireless communication network 16, a telephone function unit 33 for executing an application of VoIP, a communication processing unit 34 for controlling connection to the first wireless communication network 15 and the second wireless communication network 16, a radio information obtaining unit 35 for obtaining radio information of the first wireless communication network 15 and the second wireless communication network 16, and a handover control unit 36 for controlling handover between the first wireless communication network 15 and the second wireless communication network 16.

The communication processing unit 34, together with the first wireless I/F 31 and the second wireless I/F 32, constitutes a wireless communication unit for executing a wireless communication. The communication processing unit 34 controls connection of the first wireless I/F 31 or the second wireless I/F 32 such that the telephone function unit 33 and the counterpart communication terminal 12 communicate each other via the first wireless communication network 15 and/or the second wireless communication network 16 and communicate with the HA 23 under the control of the handover control unit 36.

The radio information obtaining unit 35 obtains communication quality of the first wireless communication network 15 and the second wireless communication network 16 as radio information from the first wireless I/F 31 and the second wireless I/F 32, correspondingly, and provides the communication quality obtained to the handover control unit 36. Here, RSSI (Received Signal Strength Indicator) indicating a radio state is obtained as the communication quality. The radio information obtaining unit 35 thus constitutes a communication quality obtaining unit for obtaining the communication quality of a wireless link.

The handover control unit 36 generates handover information including a determination whether to schedule handover, that is, whether to start handover preparation, based on the communication quality from the radio information obtaining unit 35, and then controls handover based on the handover information.

Figure 3:
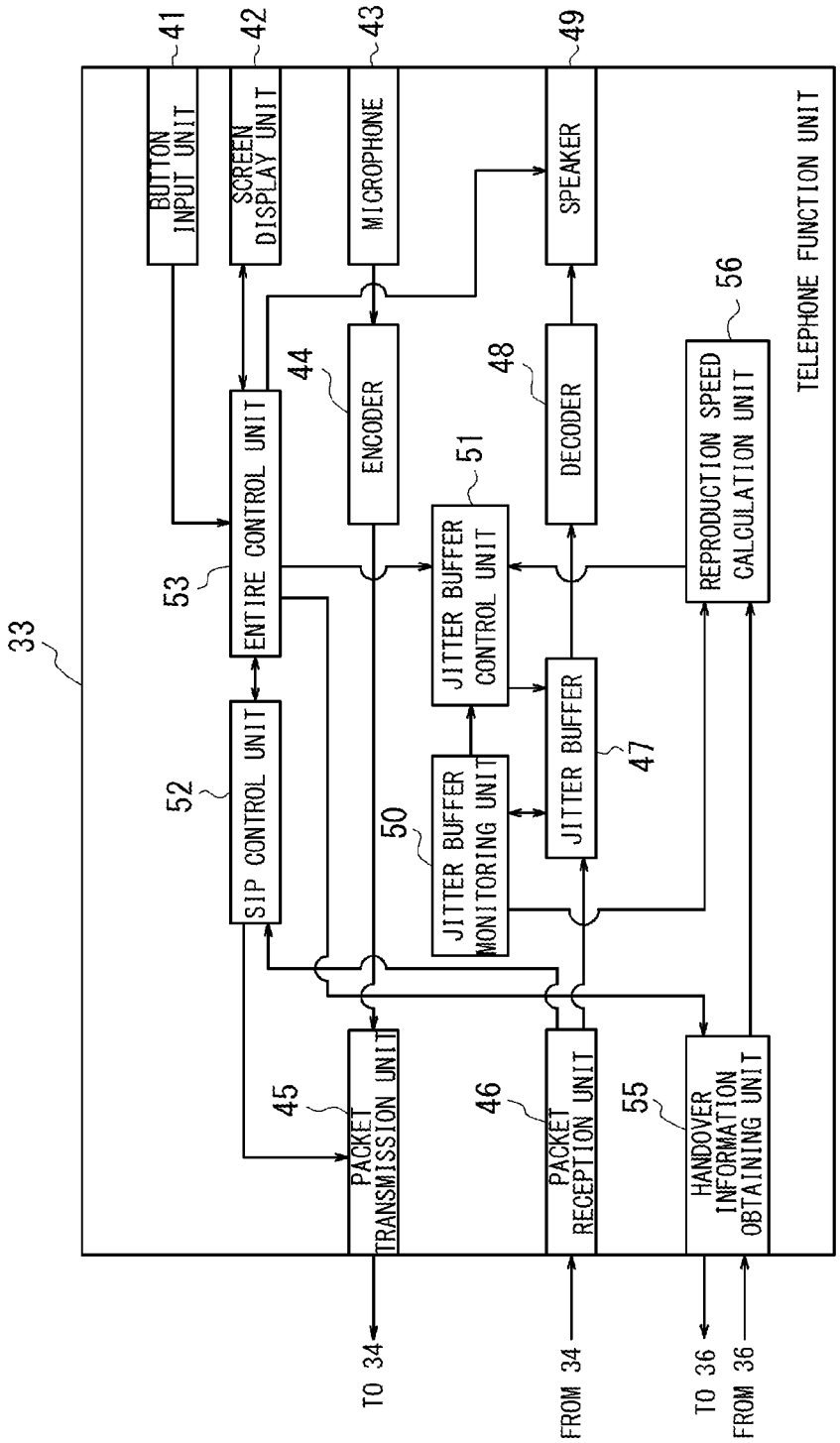
FIG. 3 is a functional block diagram illustrating a schematic constitution of a telephone function unit of the wireless communication apparatus shown in FIG. 2.

FIG. 3 is a functional block diagram illustrating a schematic constitution of the telephone function unit 33 of the wireless communication apparatus 11 shown in FIG. 2. The telephone function unit 33 may be a softphone, for example, and similarly to the constitution of a known softphone, includes a button input unit 41, a screen display unit 42, a microphone 43, an encoder 44, a packet transmission unit 45, a packet reception unit 46, a jitter buffer 47, a decoder 48, a speaker 49, a jitter buffer monitoring unit 50, a jitter buffer control unit 51, an SIP control unit 52, and an entire control unit 53 for controlling operations entirely.

The entire control unit 53 obtains operation information by a user via the button input unit 41 or the screen display unit 42 and controls entire operations based on the information obtained. The SIP control unit 52 controls SIP procedure to start or end the call. During the call, audio data obtained from the microphone 43 are encoded by the encoder 44 and the encoded data are inserted into packet by the packet transmission unit 45 and transmitted to the counterpart communication terminal 12 via the communication processing unit 34.

Packets from the counterpart communication terminal 12 received by the packet reception unit 46 via the communication processing unit 34 are once stored in the jitter buffer 47 and then read out. Payloads of the packets read out are decoded by the decoder 48 and output as reproduced voice from the speaker 49. A packet reception state of the jitter buffer 47 and the number of packets (data amount) in the jitter buffer 47 are monitored by the jitter buffer monitoring unit 50 and, based on a result of monitoring, the jitter buffer control unit 51 controls a read-out speed of the packets from the jitter buffer 47 and a process to discard the received packets and the likes.

In the wireless communication apparatus 11 according to the present embodiment, the telephone function unit 33 is further provided with a handover information obtaining unit 55 and a reproduction speed calculation unit 56. The handover information obtaining unit 55 monitors the handover information from the handover control unit 36 at predetermined intervals to obtain information on whether there is a handover schedule. If there is a handover schedule, the handover information obtaining unit 55 further obtains required handover information from the handover control unit 36 and provides the reproduction speed calculation unit 56 with the required handover information obtained.

The reproduction speed calculation unit 56, based on the required handover information obtained from the handover information obtaining unit 55, determines whether to control the read-out speed of the packets in the jitter buffer 47, that is, a reproduction speed of the received packets (reproduction speed of VoIP application in the present embodiment). In a case to control as a result, the reproduction speed calculation unit 56 calculates the reproduction speed of the received packets based on the required handover information obtained and a result of monitoring the jitter buffer 47 by the jitter buffer monitoring unit 50, and provides a result of calculation to the jitter buffer control unit 51. Thereby, the jitter buffer control unit 51 controls reading out of the received packets from the jitter buffer 47 such that the reproduction speed of the received packets meets the reproduction speed calculated by the reproduction speed calculation unit 56. Accordingly, the telephone function unit 33 of the wireless communication apparatus 11 according to the present embodiment constitutes an execution unit for executing an application of the real-time communication system, as well as a control unit for controlling the reproduction speed of the application.

The following is a description of an operation of the wireless communication apparatus 11 according to the present embodiment. First, an operation of the handover control unit 36 is mainly described.

The handover control unit 36 determines the handover schedule based on the communication quality obtained from the first wireless I/F 31 and the second wireless I/F 32. For example, if the communication quality obtained from the first wireless I/F 31 becomes lower than a handover schedule determination threshold and the communication quality obtained from the second wireless I/F 32 becomes equal to or higher than the handover schedule determination threshold during the call by forming the wireless link with the first wireless communication network 15, the handover control unit 36 determines to perform handover to the second wireless communication network 16, that is, determines to start handover preparation. The communication quality of the second wireless communication network 16 not being used for the call is obtained (measured) by receiving notification information transmitted from the base station 16a, for example.

If determining the handover schedule, the handover control unit 36 obtains a handover preparation time T1 to starting handover. In addition, the handover control unit 36 receives data via the first wireless communication network 15 and the second wireless communication network 16 separately and, based on the reception times of the same data, obtains a delay time difference T2 between the first wireless communication network 15 and the second wireless communication network 16. Then, the handover control unit 36 provides the telephone function unit 33 with such information obtained as required handover information, together with information indicating that there is a handover schedule. Accordingly, the handover control unit 36 of the wireless communication apparatus 11 according to the present embodiment constitutes a determination unit for determining whether to start handover preparation, an estimation unit for estimating the handover preparation time, and a measuring unit for measuring the delay time difference between the first wireless communication network 15 and the second wireless communication network 16.

Next, methods to obtain the handover preparation time T1 and the delay time difference T2 by the handover control unit 36 are described.

(Method to Obtain Handover Preparation Time T1)

The handover preparation time T1, as shown in FIGS. 4(a) and (b) for example, is calculated based on a change rate ΔRs (slope) of a radio state (Rs) in a unit time which determines the communication quality. Here, although the change rate ΔRs can be obtained by being measured at a point when the handover schedule is determined as the radio state becomes lower than the handover schedule determination threshold, an average change rate ΔRsrms is obtained over a period from a predetermined time before the handover schedule is determined to the time the handover schedule is determined during the call in the present embodiment.

Consequently, the handover control unit 36 calculates the change rate ΔRs(t) in the unit time (Δt) of the radio state of the wireless communication network currently being used, by a formula 1 shown below at a predetermined timing, and stores a plurality of change rates ΔRs(t) to a predetermined time before (for example, 2 seconds before) in a memory. Then, when the handover schedule is determined, the handover control unit 36 calculates the average change rate ΔRsrms over a period to the predetermined time before, from change rates stored at that timing. Here, it is assumed that the radio state is gradually deteriorated.

[Formula 1]

$$\Delta Rs(t) = |\{Rs(t) - Rs(t - \Delta t)\}/\Delta t| \quad (1)$$

Subsequently, the handover control unit 36 determines whether the average change rate ΔRsrms calculated is smaller than a change rate threshold Rsref set in advance. As a result, if ΔRsrms≤Rsref is satisfied, that is, if the radio state changes gently, the handover preparation time T1 is set to a reference time Tref (5 seconds, for example) set in advance, as shown in FIG. 4(a).

In contrast, as a result, if ΔRsrms>Rsref is satisfied, that is, if the radio state changes rapidly, T1=Tref (Rsref/ΔRsrms) is calculated, for example, and the handover preparation time T1 is set to be shorter than the reference time Tref, as the average change rate ΔRsrms is greater. FIG. 4(b) shows a case where ΔRsrms>Rsref is satisfied and the handover preparation time T1 is set to be approximately half of the reference time Tref (2.5 seconds).

(Method to Obtain Delay Time Difference T2)

The delay time difference T2 is measured by receiving a packet from the counterpart communication terminal 12 via the first wireless communication network 15 and the second wireless communication network 16 separately and using the reception times of the same packet.

Figure 5:
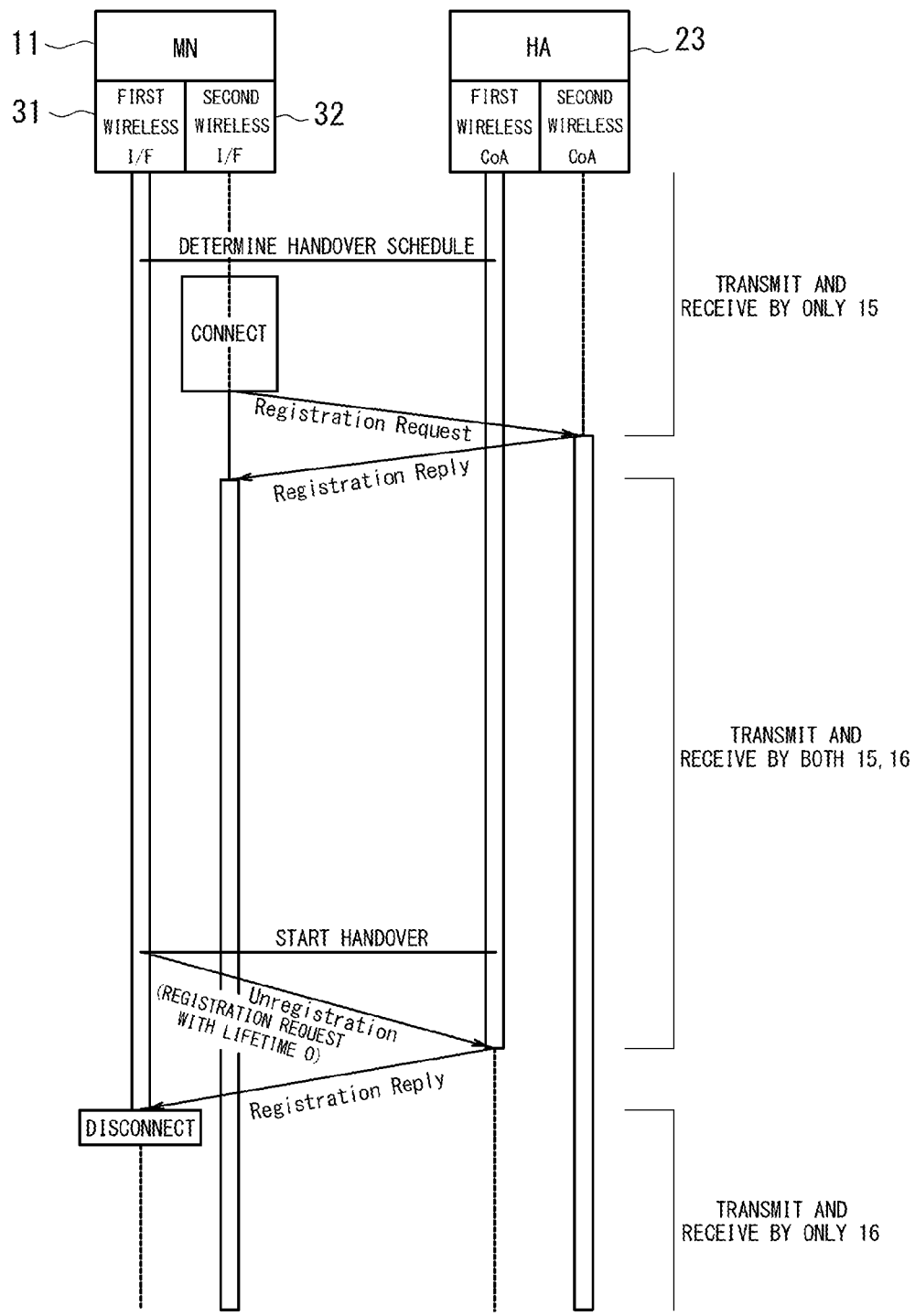
FIG. 5 is a diagram illustrating a sequence at handover between the wireless communication apparatus (MN) and HA shown in FIG. 1.

FIG. 5 is a diagram illustrating a sequence of handover between the wireless communication apparatus (MN) 11 and the HA 23. As shown in FIG. 5, the handover control unit 36, if determining the handover schedule, controls the communication processing unit 34 to connect the second wireless I/F 32 to the second wireless communication network 16. Next, the handover control unit 36 transmits Registration Request (Binding Update in NEMO) to the HA 23 via the second wireless communication network 16 of the handover destination and registers a Care-of Address (second wireless CoA) of the handover destination to the HA 23.

Subsequently, when receiving Registration Reply (Binding Acknowledge in NEMO) transmitted from HA, which is information that registration is completed, the handover control unit 36 controls so as to communicate with the counterpart communication terminal 12 by using both of the first wireless communication network 15 and the second wireless communication network 16. Thereby, the handover control unit 36 measures the delay time difference (reception time difference) T2 from reception times of the same packet received via the first wireless communication network 15 and the second wireless communication network 16 separately.

Figure 6:
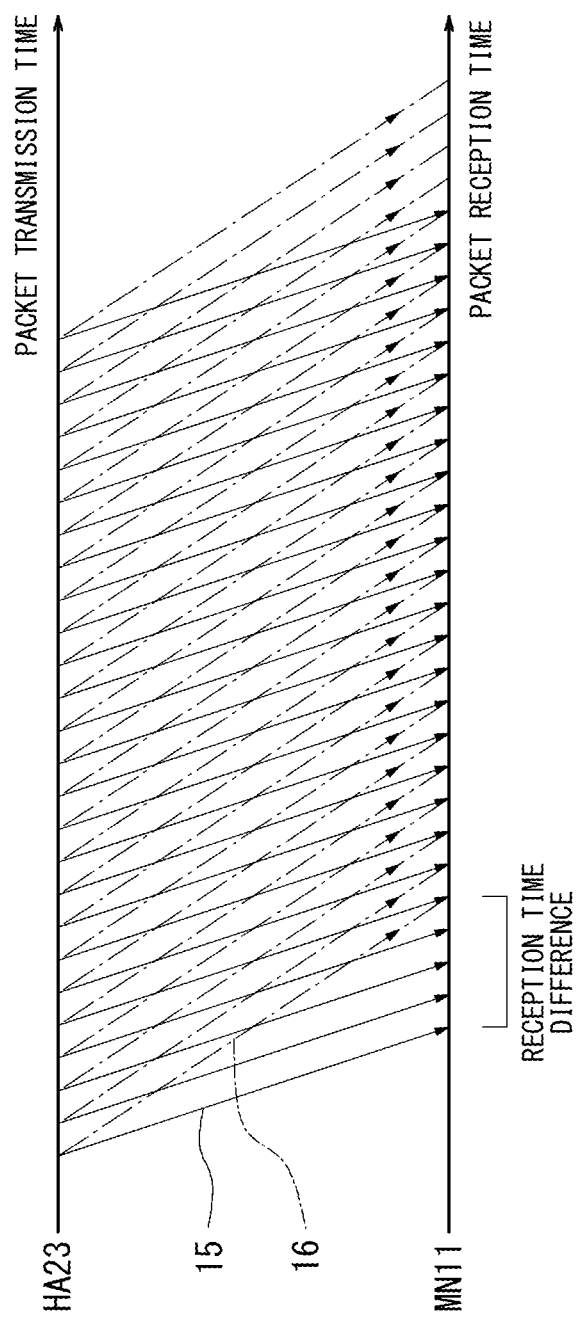
FIG. 6 is a diagram illustrating a method to obtain a delay time difference.

According to the present embodiment, a difference in the reception times of the same packet is defined as a value calculated by subtracting a reception time by the first wireless communication network 15 from a reception time by the second wireless communication network 16. In addition, as shown in FIG. 6, an average value of differences in the reception times of a predetermined number of the same packets received via the first wireless communication network 15 and the second wireless communication network 16 separately is obtained as the delay time difference T2.

The communication processing unit 34 monitors the packets received via the first wireless communication network 15 and the second wireless communication network 16 and, if receiving the same packet, provides the telephone function unit 33 with the packet first received.

As described above, the handover control unit 36 obtains the handover preparation time T1 and the delay time difference T2 between the first wireless communication network 15 and the second wireless communication network 16, and provides such information obtained to the telephone function unit 33.

Moreover, if determining the handover schedule, the handover control unit 36 transmits Unregistration indicating start of handover, that is, Registration Request with Lifetime 0 (Binding Update with Lifetime 0 in NEMO) to the HA 23 via the first wireless communication network 15 of the handover source when the handover preparation time T1 has passed, as shown in FIG. 5, so as to request deregistration of the Care-of Address (first CoA) of the handover source to the HA 23.

Then, when receiving Registration Replay (Binding Acknowledge in NEMO) as handover completion information transmitted from HA 23 via the first wireless communication network 15, the handover control unit 36 disconnects the first wireless communication network 15 of the handover source. Thereafter, the handover control unit 36 controls the communication processing unit 34 to maintain VoIP application via the second wireless communication network 16 of the handover destination and provides the telephone function unit 33 with the handover completion information received.

Figure 7:
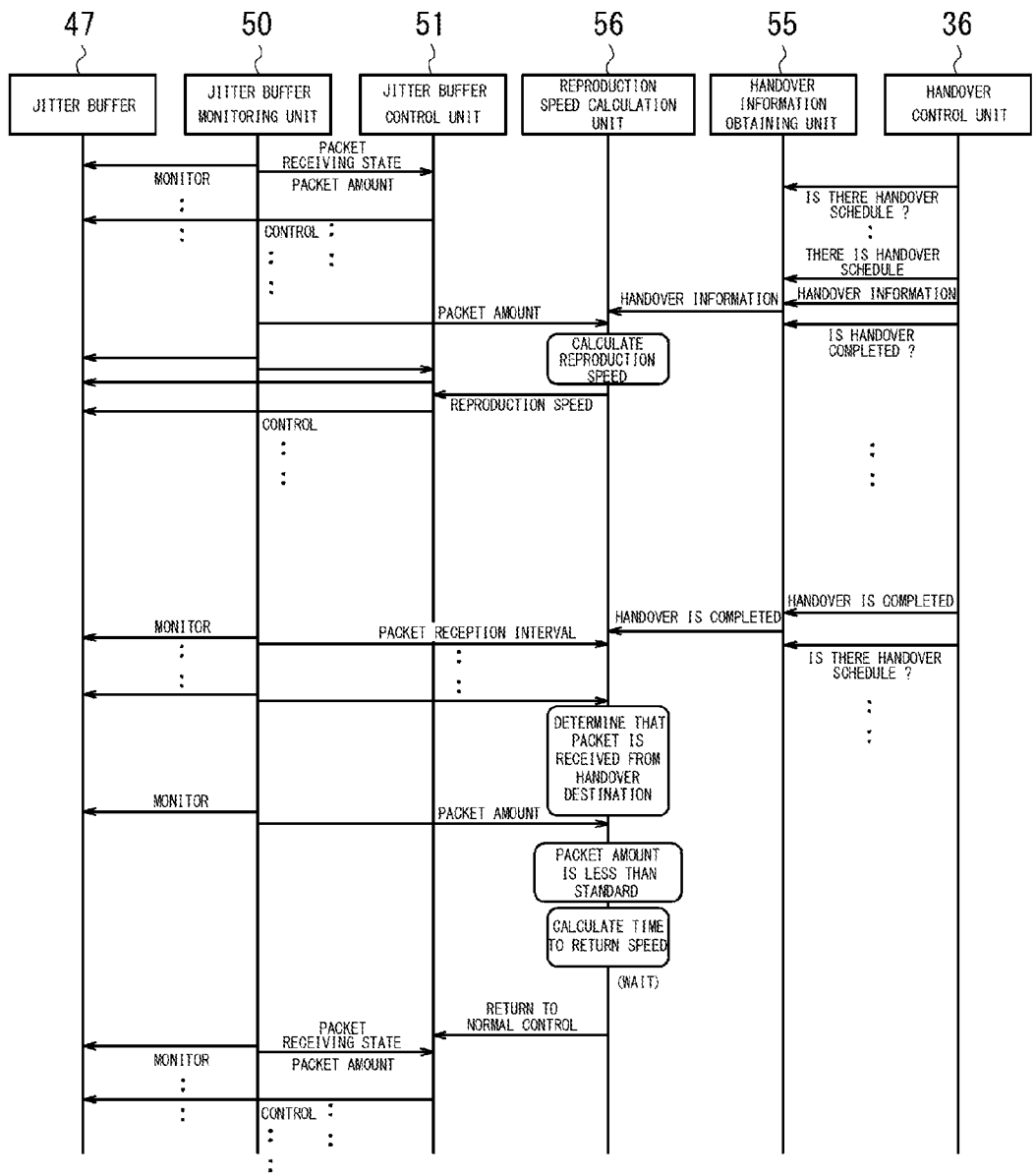
FIG. 7 is a sequence diagram illustrating an operation of a main section of the telephone function unit shown in FIG. 3.

Next, an operation of the telephone function unit 33 is described. FIG. 7 is a sequence diagram illustrating an operation of a main section of the telephone function unit 33. The handover information obtaining unit 55 monitors handover information from the handover control unit 36 at certain intervals. If information indicating that there is a handover schedule is obtained as a result, the handover information obtaining unit 55 further obtains the handover preparation time T1 and the delay time difference T2, which are the required handover information, from the handover control unit 36, and provides the reproduction speed calculation unit 56 with the required handover information.

Based on the required handover information obtained from the handover information obtaining unit 55, the reproduction speed calculation unit 56 first determines whether the delay time difference T2 exceeds a predetermined value (>0), that is, whether the downlink absolute delay time of the second wireless communication network 16 of the handover destination is so longer than the downlink absolute delay time of the first wireless communication network 15 of the handover source as to exceed the predetermined value.

If the delay time difference T2 exceeds the predetermined value as a result, the reproduction speed calculation unit 56, based on the required handover information obtained and the result of monitoring the jitter buffer 47 by the jitter buffer monitoring unit 50, calculates the reproduction speed V of the received packets in the jitter buffer 47 by using Formula 2 shown below, such that the number of packets in the jitter buffer 47 is becomes zero at time to start receiving packets from the second wireless communication network 16 of the handover destination. In Formula 2, V1 indicates a standard reproduction speed. Tb indicates a time corresponding to the number of packets (amount of data) in the jitter buffer 47 at time to receive the information that handover is scheduled. In addition, reproduction speeds V and V1 are expressed by a time ratio (time/time) and V=1, for example.

[Formula 2]

$$V=(Tb+T1\times V1)/(T1+T2) \quad (2)$$

The reproduction speed V calculated by the reproduction speed calculation unit 56 is provided to the jitter buffer control unit 51. Thereby, the jitter buffer control unit 51 controls reading out of the received packets from the jitter buffer 47 so as to reproduce the received packets at the reproduction speed V, which is slower than the standard reproduction speed.

Here, control of the reproduction speed of the received packets by the jitter buffer control unit 51 is performed by one of a first reproduction speed control method or a second reproduction speed control method described below, for example.

(a) First Reproduction Speed Control Method

It is assumed that TR=TR1/k, where TR1 is read-out interval of the packets from the jitter buffer 47 corresponding to the standard reproduction speed V1, k is $(Tb+T1\times V1)/(T1+T2)$ in Formula 2 shown above, and TR is read-out interval of the packets from the jitter buffer 47 corresponding to the reproduction speed V calculated. For example, in order to render the reproduction speed V to be 80% of the standard reproduction speed V1 (k=0.8) for the VoIP application which reads out and reproduces the packets in the jitter buffer 47 at intervals of 20 msec at the standard reproduction speed V1, the read-out interval TR of the packets from the jitter buffer 47 is determined to satisfy TR=20/0.8 (msec).

(b) Second Reproduction Speed Control Unit

When the control of the reproduction speed for handover is started, a combination of a time stamp of a packet (first packet) reproduced immediately thereafter and a reproduction time thereof is recorded. Packets thereafter are read out and reproduced from the jitter buffer 47 at time Tv in Formula 3 shown below. In Formula 3, TD indicates the delay time and an initial value thereof is zero.

[Formula 3]

$$Tv=(\text{time stamp of packet}-\text{time stamp of first packet})+ (\text{reproduction time of first packet}+TD) \quad (3)$$

Figure 8:
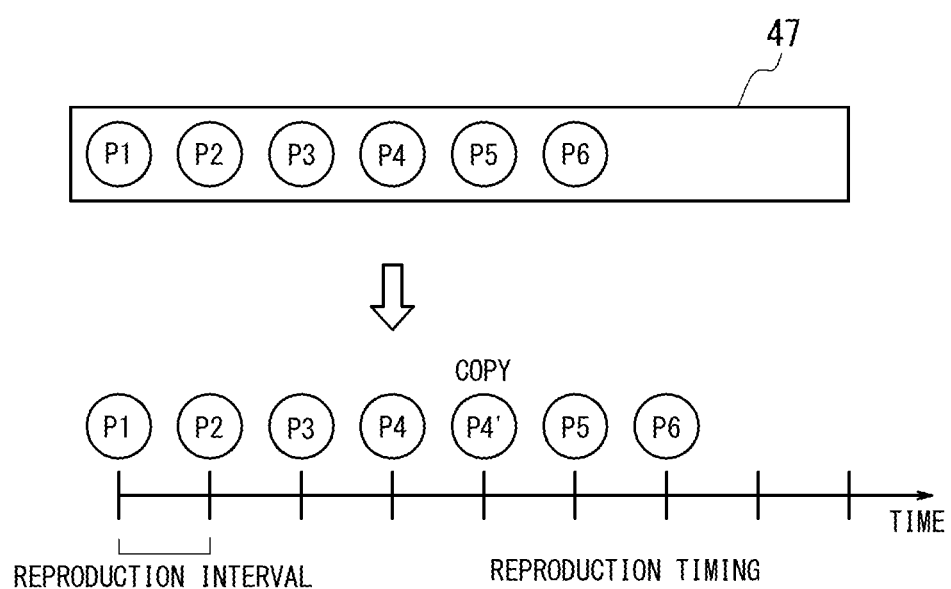
FIG. 8 is a diagram illustrating an exemplary control method of a reproduction speed of a received packet by a jitter buffer control unit shown in FIG. 3.

Here, when the packets are read out from the jitter buffer 47, a packet read out at $[\{V1/(V1-V)\}-1]$th is copied and stored in a memory of the decoder 48. After reproduction of the original packet, the copied packet is read out and reproduced at next reproduction timing. For example, when the reproduction speed V is set to be 80% of the standard reproduction speed V1, four sequential packets P1 to P4 in the jitter buffer 47 are read out and reproduced sequentially and the fourth packet P4 is copied, and a copied packet P4' is reproduced at a next reproduction timing after reproduction of the original packet P4, as shown in FIG. 8. Then, when a packet P5 is read out from the jitter buffer 47, TD in the above Formula 3 is increased as long as the time of reproduction interval by copying. It is to be noted that, if the packet to be read out at $[\{V1/(V1-v)\}-1]$th is not in the jitter buffer 47 because of not being received yet or being discarded, the same processing is performed on a packet of a next reproduction timing.

As described above, the jitter buffer control unit 51 controls the reproduction speed of the received packets. Then, when the handover information obtain unit 55 obtains the handover completion information from the handover control unit 36, the reproduction speed calculation unit 56 obtains a reception interval of the packets at predetermined intervals. Subsequently, the reproduction speed calculation unit 56 calculates an average value of packet reception intervals obtained for a predetermined period and monitors whether a difference between the average value of the packet reception intervals calculated and a standard reception interval of the VoIP application falls in a threshold.

If the difference falls in the threshold as a result, the reproduction speed calculation unit 56 judges that the packet from the handover destination has been received, obtains the number of packets (data amount) in the jitter buffer 47 at that timing from the jitter buffer monitoring unit 50, and determines whether the number of packets obtained exceeds a predetermined amount.

If the number of packets in the jitter buffer 47 does not exceed the predetermined amount as a result, the reproduction speed calculation unit 56 instructs the jitter buffer control unit 51 so as to return to a normal reproduction speed control after t=(Ta-Tb)/(V1-V), at which the number of packets exceeds the predetermined amount. Here, Ta is a jitter buffer standard delay time corresponding to the standard number of packets in the jitter buffer 47. In contrast, if the number of packets in the jitter buffer 47 exceeds the predetermined amount, the reproduction speed calculation unit 56 instructs the jitter buffer control unit 51 so as to return to the normal reproduction speed control immediately. That is, if the reproduction speed calculation unit 56 determines that the packets from the handover destination have been received, the jitter buffer control unit 51 controls reading out from the jitter buffer 47 so as to return to the standard reproduction speed V1 when the number of packets in the jitter buffer 47 exceeds the predetermined amount.

Figure 9:
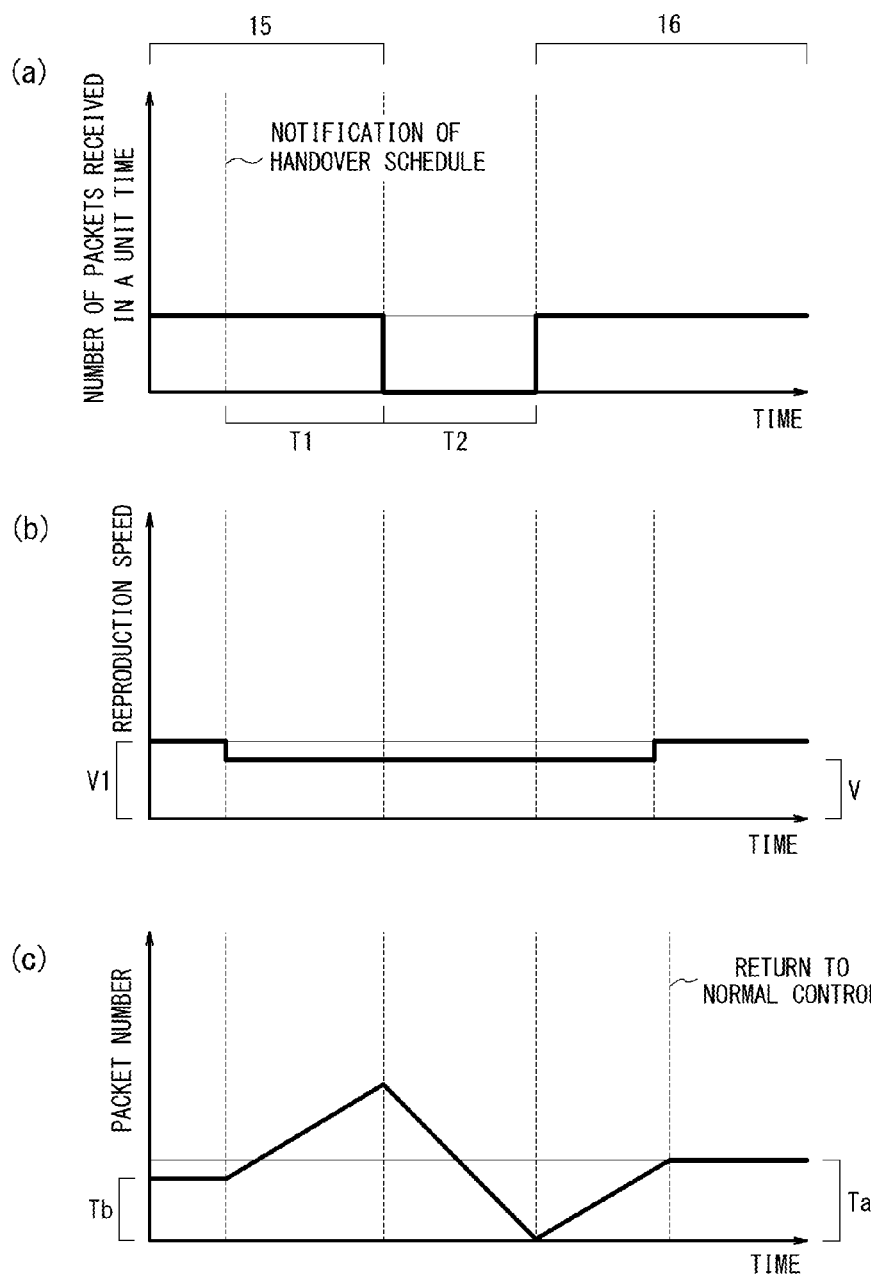
FIG. 9 is diagrams illustrating an exemplary control method of a jitter buffer by the telephone function unit shown in FIG. 3.
Figure 10:
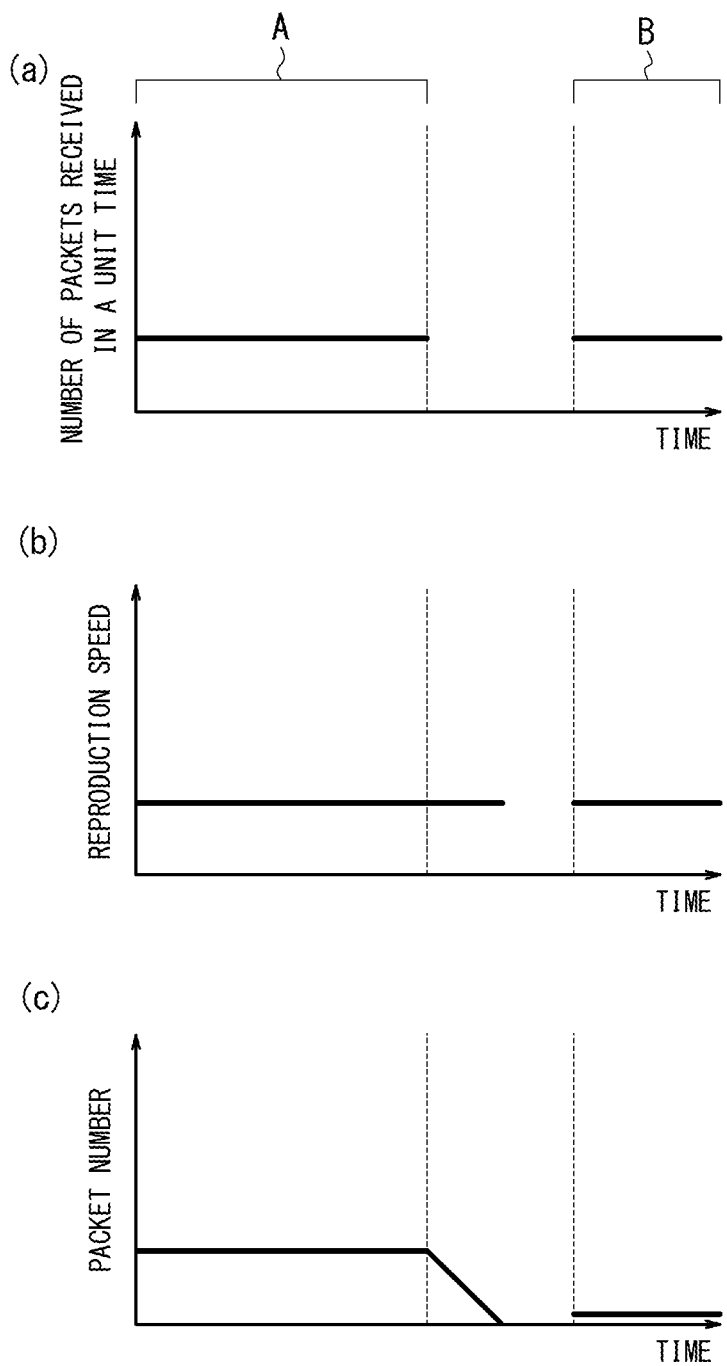
FIG. 10 is diagrams illustrating an exemplary conventional control method of the jitter buffer.
Figure 11:
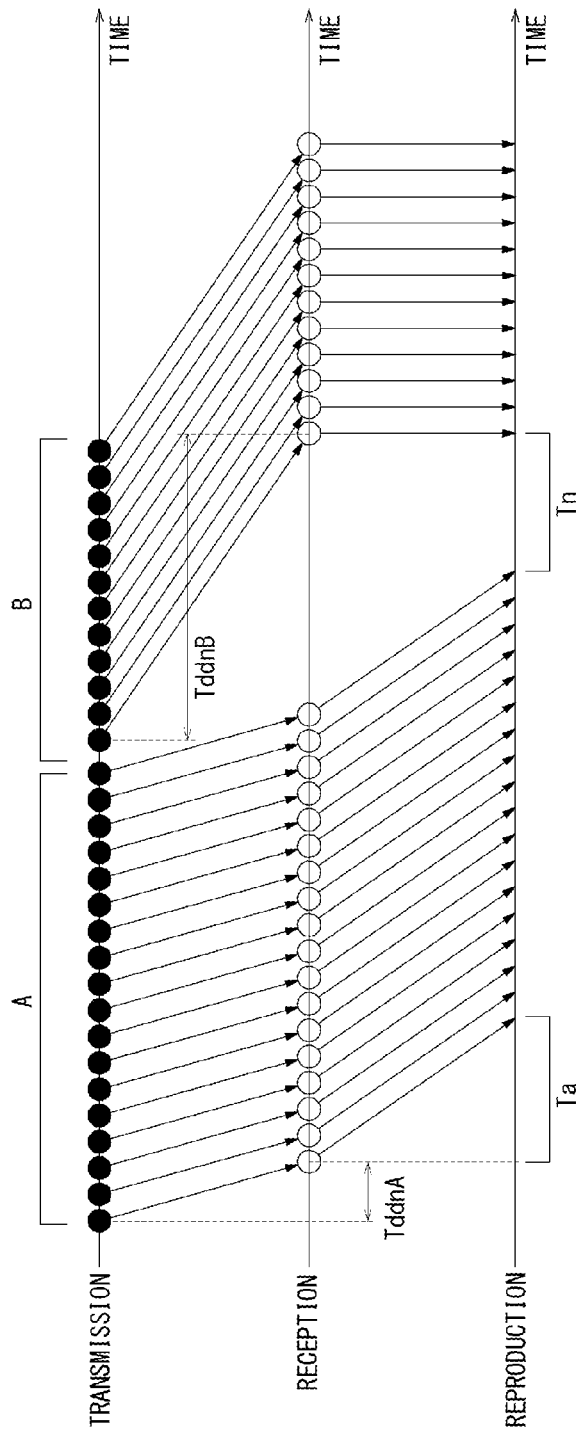
FIG. 11 is a diagram illustrating flows of packets by the control method shown in FIG. 10.
Figure 12:
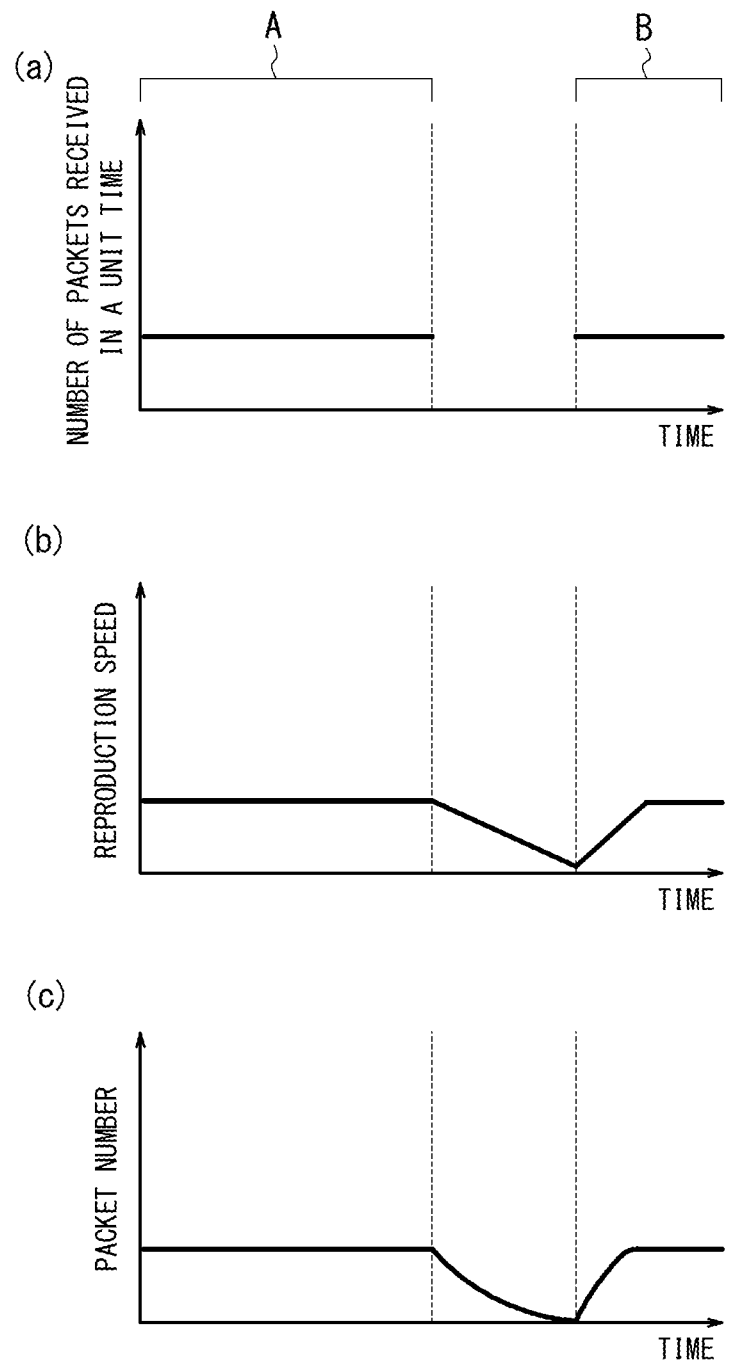
FIG. 12 is diagrams illustrating another exemplary conventional control method of the jitter buffer.
Figure 13:
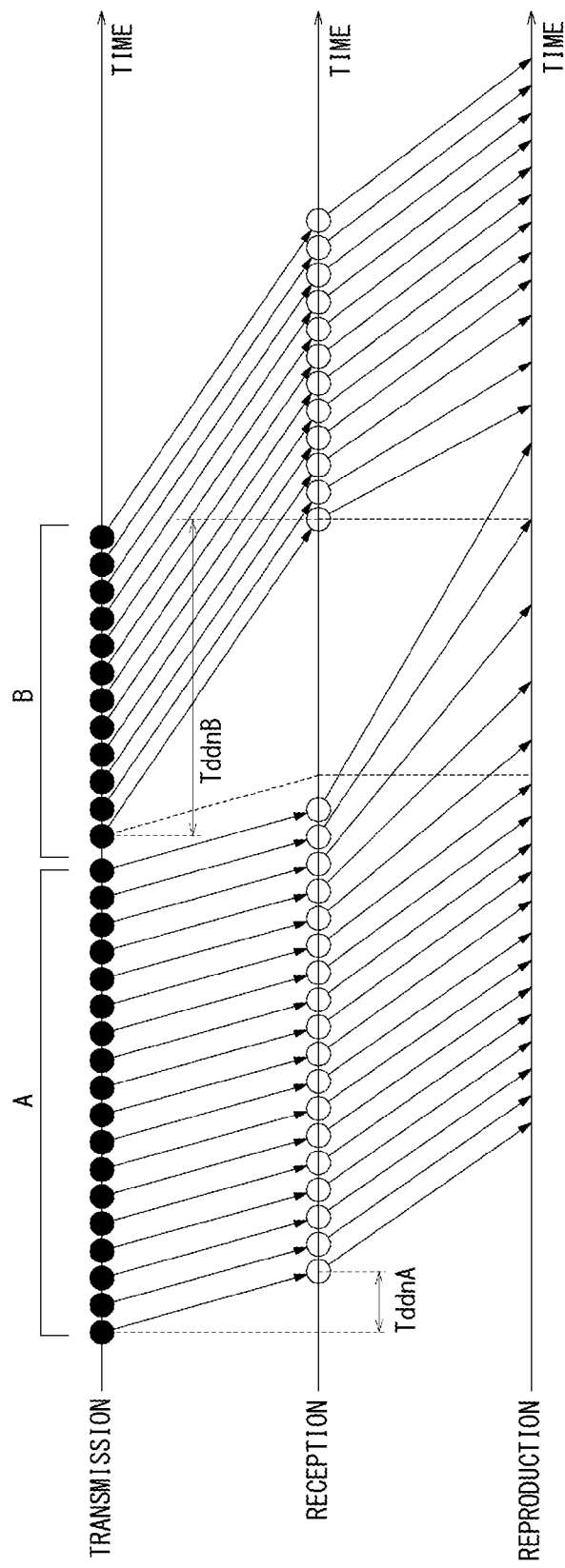
FIG. 13 is a diagram illustrating flows of the packets by the control method shown in FIG. 12.

FIG. 9 is a diagram illustrating a control method of the jitter buffer 47 according to the present embodiment. In FIG. 9, (a), (b) and (c) indicate the number of packets received by the jitter buffer 47 in the unit time, the reproduction speed (read-out intervals) of the packets from the jitter buffer 47, and the number of packets in the jitter buffer 47, respectively.

According to the wireless communication apparatus 11 of the present embodiment described above, in order to perform handover from the first wireless communication network 15 having a shorter absolute delay time to the second wireless communication network 16 having a longer absolute delay time, the handover preparation time T1 to handover and the delay time difference T2 are obtained in advance. Therefore, it is possible to know for how long and how long after determination of start to prepare for handover the packet will not arrive. Accordingly, since it is possible to control, taking a long time from determining to start handover preparation, the reproduction speed V to absorb the delay time difference T2 between the first wireless communication network 15 and the second wireless communication network 16 so as to be able to reproduce the packets received from the first wireless communication network 15 of the handover source even while the packets do not arrive, a difference from the standard reproduction speed V1 is reduced.

Moreover, during a period after determination of the handover schedule and before starting handover, the wireless communication apparatus 11 communicates with the counterpart communication terminal 12 by using both of the first wireless communication network 15 and the second wireless communication network 16 and thereby obtains the delay time difference T2 between the first wireless communication network 15 and the second wireless communication network 16 from reception times of the same packet received from the two networks. Accordingly, in comparison with a case to obtain the delay time difference by using the delay time difference set in advance for each wireless communication system, it is possible to optimally control the reproduction speed of the application by obtaining the delay time difference T2 accurately based on the actual radio state.

In addition, the reproduction speed of the application after determination of the handover schedule is controlled such that the number of packets in the jitter buffer 47 becomes zero at the point to start receiving the packets from the handover destination. Thereby, it is possible to lengthen a time to absorb the delay time difference between the first wireless communication network 15 of the handover source and the second wireless communication network 16 of the handover destination. Accordingly, since it enables to reproduce the application at a stable reproduction speed closer to the standard reproduction speed, it is possible to perform handover from the first wireless communication network 15 to the second wireless communication network 16 without deteriorating reproduction quality and real-time property.

It is to be understood that the present invention is not limited to the above embodiment but may be modified or varied in a multiple of manners. For example, although in the above embodiment it is controlled such that the number of packets in the jitter buffer 47 becomes zero at a time to start receiving the packets from the handover destination when the reproduction speed calculation unit 56 calculates the reproduction speed V, it is also possible to calculate the reproduction speed V such that the number of packets in the jitter buffer 47 is a predetermined number at time to start receiving the packets from the handover destination. In addition, the present invention is applicable not only when executing the VoIP application but also when executing an application of a real-time communication system such as for streaming and reproducing multimedia data such as images and music. In such a case, the execution unit of the application is constituted of a multimedia function unit having a similar function to control the jitter buffer, instead of the telephone function unit. Moreover, the present invention is applicable not only to handover between the wireless LAN and cdma2000 1xEV-DO but also to handover between arbitrary different wireless communication networks such as, for example, PDC (Personal Digital Cellular), W-CDMA (Wideband CDMA), PHS (Personal Handy-phone System), Bluetooth, WiMAX (Worldwide Interoperability for Microwave Access), LTE (Long Term Evolution), UMB (Ultra Mobile Broadband), IMT-Advanced, and the likes.

The invention claimed is:

1. A wireless communication apparatus comprising:
a wireless communication unit operable to perform wireless communication by connecting to a first wireless communication network and a second wireless communication network different from the first wireless communication network;
an execution unit comprising a jitter buffer operable to absorb jitter of data received and a jitter buffer monitoring unit operable to monitor an amount of data in the jitter buffer, and operable to execute an application for real-time communication via the wireless communication unit;
a communication quality obtaining unit operable to obtain communication quality of a wireless link of the first wireless communication network during execution of the application by connecting to the first wireless communication network;
a determination unit operable to determine whether to start preparing handover from the first wireless communication network to the second wireless communication network based on the communication quality obtained by the communication quality obtaining unit;
an estimation unit operable, when the determination unit determines to start handover preparation during execution of the application, to estimate a handover preparation time to start handover based on the communication quality obtained by the communication quality obtaining unit;
a measuring unit operable, when the determination unit determines to start handover preparation, to receive data via the first wireless communication network and the second wireless communication network separately and to measure a delay time difference between the first wireless communication network and the second wireless communication network based on reception times of the same data received;
a control unit operable to control a reproduction speed of the application by the execution unit based on the handover preparation time estimated by the estimation unit, the delay time difference measured by the measuring unit, and an amount of data in the jitter buffer monitored by the jitter buffer monitoring unit at a time when the determination unit determines to start handover preparation; and
a jitter buffer control unit, wherein the jitter buffer and jitter monitoring unit are operable to communicate with a reproduction speed calculation unit that is operable to calculate a reproduction speed V using the following formula, and to provide the calculated reproduction speed V to the jitter buffer control unit:

$$V=(Tb+T1 \times V1)/(T1+T2), \text{ where:}$$

Tb is a time that corresponds to a number of packets in the jitter buffer at the start of handover preparation;

T1 is a handover preparation time;

V1 is a standard reproduction speed; and

T2 is a time delay difference between the first wireless communication network and the second wireless communication network.

2. The wireless communication apparatus according to claim 1, wherein the control unit is operable, if the reception time by the second wireless communication network is later than the reception time by the first wireless communication network by a predetermined time or longer, to slow down the reproduction speed of the application by the execution unit.

3. The wireless communication apparatus according to claim 2, wherein the control unit is operable to slow down the reproduction speed of the application by the execution unit after starting handover preparation.

4. The wireless communication apparatus according to claim 3, wherein the control unit is operable to slow down the reproduction speed of the application by the execution unit such that the amount of data in the jitter buffer becomes zero at time to start receiving data from the second wireless communication network.

5. The wireless communication apparatus according to claim 2, wherein the control unit is operable to return the reproduction speed of the application to a normal speed, if the amount of data in the jitter buffer monitored by the jitter buffer monitoring unit exceeds a predetermined amount after completion of handover to the second wireless communication network.

6. The wireless communication apparatus according to claim 1, wherein the measuring unit is operable to measure what the time delay difference between the first wireless communication network and the second wireless communication network is at the time of handover.

7. The wireless communication apparatus according to claim 1, wherein the reproduction speed of the application is the reproduction speed of a voice-over-internet-protocol (VoIP) application.

8. The wireless communication apparatus according to claim 1, wherein the communication quality of a wireless link is the signal strength of the wireless link.

9. The wireless communication apparatus according to claim 1, wherein the reproduction speed of the application during handover is substantially the same as the reproduction speed of the application immediately prior to, and immediately after, handover.

10. The wireless communication apparatus according to claim 9, wherein the reproduction speed of the application during handover is less than a standard reproduction speed.

11. The wireless communication apparatus according to claim 1, wherein, in operation, the reproduction speed calculation unit calculates the reproduction speed V if T2 exceeds a predetermined value.

12. The wireless communication apparatus according to claim 1, wherein the jitter buffer control unit is operable to control reproduction speed by reading out packets from the jitter buffer at a read-out interval TR that corresponds to the reproduction speed V, where TR is determined using the following:

$$TR = TR1/k, \text{ where:}$$

TR1 is a read-out interval corresponding to the standard reproduction speed V1; and $k = (Tb + T1 \times V1)/(T1 + T2)$.

13. The wireless communication apparatus according to claim 1, wherein the jitter buffer control unit is operable to control reproduction speed by reading out packets from the jitter buffer at a read-out interval Tv, where Tv is determined using the following:

$$Tv = (\text{time stamp of a selected packet} - \text{time stamp of first packet}) + (\text{reproduction time of first packet} + TD), \text{ where:}$$

TD indicates a delay time, whose initial value is zero.

14. The wireless communication apparatus according to claim 13, wherein the time stamp of a selected packet is the time stamp of a packet that is reproduced immediately after handover.

* * * * *